United States Patent
Ronca

(10) Patent No.: US 6,745,221 B1
(45) Date of Patent: Jun. 1, 2004

(54) DYNAMIC RESOURCE REALLOCATION

(75) Inventor: David R. Ronca, San Jose, CA (US)

(73) Assignee: Mitel, Inc., Herndon, VA (US)

( * ) Notice: Subject to any disclaimer, the term of this patent is extended or adjusted under 35 U.S.C. 154(b) by 0 days.

(21) Appl. No.: 09/259,986

(22) Filed: Mar. 1, 1999

(51) Int. Cl.$^7$ .............................................. G06F 17/00
(52) U.S. Cl. ....................... 709/104; 370/231; 370/257
(58) Field of Search ................................ 370/230, 232, 370/216, 229; 709/100, 223, 224, 104, 226

(56) References Cited

U.S. PATENT DOCUMENTS

| | | | |
|---|---|---|---|
| 4,959,854 A | | 9/1990 | Cave et al. |
| 5,349,636 A | | 9/1994 | Irribarren |
| 5,530,740 A | | 6/1996 | Irribarren et al. |
| 5,673,253 A | * | 9/1997 | Shaffer ....................... 370/229 |
| 5,737,395 A | | 4/1998 | Irribarren |
| 5,774,668 A | * | 6/1998 | Choquier et al. ........... 709/223 |
| 5,841,966 A | | 11/1998 | Irribarren |
| 6,304,549 B1 | * | 10/2001 | Srinivasan et al. ......... 370/230 |
| 6,335,927 B1 | * | 1/2002 | Elliott et al. ................ 370/352 |

FOREIGN PATENT DOCUMENTS

| | | |
|---|---|---|
| EP | 0 581 484 A2 | 2/1994 |
| EP | 0 690 603 A | 1/1996 |

* cited by examiner

Primary Examiner—John Follansbee
Assistant Examiner—Dustin Nguyen
(74) Attorney, Agent, or Firm—Beyer Weaver & Thomas, LLP

(57) ABSTRACT

A resource allocation manager to allocate resources to handle applications in a messaging system includes a database storing a set of resource allocation rules to govern the allocation of resources to applications. A resource allocation engine is responsive to events that potentially effect the manner in which resources are allocated. The resource allocation agent accesses the database and interprets the resource allocation rules in response to events to determine if the events warrant a reallocation of resources to handle applications. Allocation agents are responsive to the resource allocation engine and reallocate resources to handle applications when detected events warrant a reallocation of resources. A method of allocating resources in a messaging system is also provided.

27 Claims, 2 Drawing Sheets

DYNAMIC RESOURCE REALLOCATION

FIELD OF THE INVENTION

The present invention relates to messaging systems and, in particular, to allocation of resource usage to various applications in a messaging system.

BACKGROUND OF THE INVENTION

Voice messaging systems are common in today's business community. Most business organizations or enterprises make use of a private branch exchange (PBX) to direct a caller's telephone call to the appropriate extension of the called party. If the called party is unable to answer the telephone call, the telephone call is forwarded to a voice messaging system, which allows the caller to leave a voice message in the mailbox assigned to the called party. Messages left for called parties within the business organization can be retrieved from memory by calling the voice messaging system using a telephone and entering appropriate commands via a touch-tone keypad. Retrieved messages can be played, forwarded or deleted. An example of a voice messaging system of this nature is the Series 6 sold by Mitel Corporation of Ottawa, Ontario, Canada.

In addition to voice messages, communications within business organizations are also stored in facsimile and text formats. In the past, separate messaging systems have been used to handle these different types of communications. Unfortunately, prior art messaging systems designed to handle one type of communication have not provided any means to interact with messaging systems handling other types of communications. This has required users to access each messaging system individually to retrieve messages and has required business organizations to maintain and manage multiple messaging systems separately. As a result, it has been necessary to establish separate accounts, address lists and message mailboxes in each messaging system for the various users in the business organizations.

More recently, attempts have been made to interconnect different messaging systems to provide access to different types of messages from a single point. For example, U.S. Pat. No. 5,349,636 to Irribarren discloses a system and method for voice mail systems and interactive voice response (IVR) systems. The Irribarren system includes a voice message system and a text message system integrated via a network, which coordinates the functions of each individual message system. A user may access messages stored in the voice message system and in the text message system via a single telephone call. Although this system allows access to different types of messages, the voice message and text message systems require separate management.

The current trend is to integrate these various messaging systems to allow users to access all types of communications once a connection is made to the messaging system. To that end, unified messaging systems have been developed to provide users access to virtually all of their communications. Messaging systems of this nature store all messages for entities within the enterprise at a common location. The entities may be individuals, groups, departments, or any appropriate logical organizations. Users accessing the messaging system via a telephone, desktop computer or other communication device have access to all of their messages regardless of message type and regardless of the type of communication device used to access the messaging system. Appropriate message translators such as text-to-speech (TTS) converters, speech-to-text (SST) converters etc. are included to enable users to retrieve messages stored in formats not supported by the communication devices used to access the messaging system.

Unified messaging systems include both incoming (messaging, auto-attendant, etc.) and outgoing (paging, fax delivery, call-me, etc.) applications. These incoming and outgoing applications run either on separate or shared ports or resources. Using separate ports for applications does not make particularly good use of available hardware but guarantees resource availability. Using shared ports, makes good use of available hardware but does not provide for guaranteed resource availability. Typically, the administrator of the messaging system statically assigns separate and shared ports to the applications within the messaging system based on a traffic model for the messaging system. Unfortunately, statically assigning ports to the applications can lead to a number of problems depending on traffic.

Consider a case of an eight (8) port messaging system having four ports dedicated to handle only incoming calls, two shared ports capable of handling any application, and two shared ports dedicated to handle only outgoing applications. The two shared ports and two outgoing application ports provide four ports for fax resources, which are available on a first-come, first-served basis. With this static port allocation, a number of problems can arise depending on traffic. If, for example, a large number of fax and page delivery jobs are pending and if two ports are being used by an outgoing application such as call-me and one port is being used for normal messaging, then only two ports are available to handle the fax and page delivery jobs even though three of the incoming call ports are idle. As another example, if there are no fax or page delivery jobs pending but six of the ports are being used for normal messaging, the two outgoing application ports will be available to handle any upcoming fax or page delivery jobs. Hence, a caller to the messaging system will get a busy tone since no ports are available to handle the incoming call even though the two outgoing application ports are idle. As will be appreciated, statically assigning ports to applications can lead to poor resource allocation especially if unexpected traffic situations arise.

Thus, there is a need for improvements to resource allocation in messaging systems.

SUMMARY OF THE INVENTION

The present invention provides improved resource allocation to applications of a messaging system. By monitoring the messaging system, resource allocation to applications can be performed dynamically so that better and more effective utilization of the resource can be had. The improved resource allocation leads to more responsive servicing of applications (e.g., incoming and outgoing applications) by the messaging system.

According to one aspect of the present invention there is provided a resource allocation manager to allocate resources to handle applications in a messaging system. The resource allocation manager includes: a database storing a set of resource allocation rules to govern the allocation of resources to applications; a resource allocation engine responsive to events that potentially effect the manner in which the resources are allocated, the resource allocation engine accessing the database and interpreting the resource allocation rules in response to events to determine if the events warrant a reallocation of the resources to applications; and allocation agents responsive to the resource allocation engine and reallocating the resources to applications when detected events warrant a reallocation of the resources.

In one embodiment, the resource allocation manager further comprises a plurality of event detection agents to monitor the messaging system to detect the events and to communicate the events to the resource allocation engine. The event detection agents include a traffic level agent to detect traffic levels. The event detection agents can also include a system clock agent to detect particular times of the day, which is useful for detecting traffic peak periods and non-peak periods or business and non-business hours.

According to another aspect of the present invention there is provided a method for allocating resources to handle applications in a messaging system. The method includes the operations of: establishing a set of resource allocation rules to govern the allocation of the resources to applications; monitoring the messaging system to detect events that potentially effect the manner in which the resources are allocated; accessing the resource allocation rules in response to the detected events to determine if the detected events warrant a reallocation of the resources to handle applications; and reallocating the resources to handle applications in accordance with the resource allocation rules if the detected events warrant a reallocation of resources.

According to another aspect of the present invention there is provided a computer readable medium including computer code for allocating resources of a messaging system to handle applications in the messaging system. The computer readable medium includes: computer program code for accessing a set of resource allocation rules that govern allocation of the resources to applications in the messaging system; computer program code for monitoring of the messaging system to detect events that potentially effect the manner in which the resources are allocated; computer program code for determining whether the detected events trigger a reallocation of the resources to handle applications based on the resource allocation rules; and computer program code for reallocating the resources to handle applications when the computer program code for determining triggers the reallocation.

The present invention provides advantages in that resources are allocated to applications dynamically to accommodate changes in messaging system requirements. As a result, situations where some resources are idle yet at the same time resources are unavailable to handle other applications, occur to a lesser extent than in conventional messaging systems implementing a static resource allocation methodology. In high capacity messaging systems, a rules-based approach for allocating resources to applications provides for the reallocation of a significant number of resources in an intelligent manner.

BRIEF DESCRIPTION OF THE DRAWINGS

An embodiment of the present invention will now be described more fully with reference to the accompanying drawings in which.

DETAILED DESCRIPTION OF THE INVENTION

The present invention relates to a messaging system including a resource allocation manager to allocate resources dynamically to applications. The present invention can be implemented in virtually any type of messaging system where applications are allocated resources such as voice messaging systems, interactive voice response (IVR) systems, voice and text messaging systems, and unified messaging systems.

Figure 1:
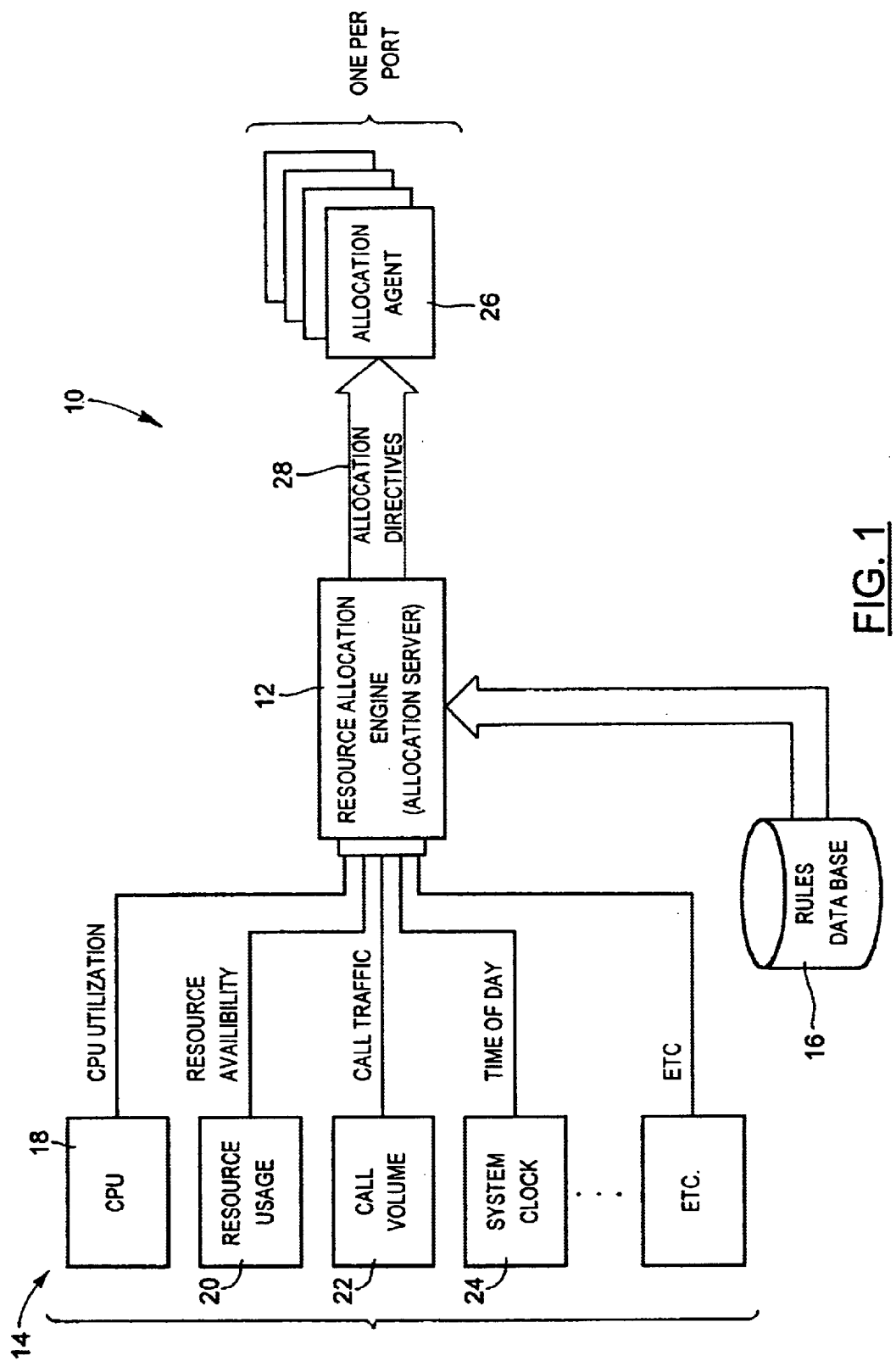
FIG. 1 is a schematic drawing of a resource allocation manager in accordance with the present invention.

Turning now to FIG. 1, a resource allocation manager 10 for a messaging system is shown. As can be seen, the resource allocation manager 10 includes a resource allocation engine 12. The resource allocation manager 10 can, for example, run on an allocation server. The resource allocation engine 12 is responsive to trigger events of interest generated by trigger event agents 14 and communicates with a rules database 16. The rules database 16 stores resource allocation rules. The resource allocation engine 12 also communicates with a plurality of allocation agents 26. Each allocation agent 26 is associated with a respective port of the messaging system. The allocation agents 26 assign ports to applications within the messaging system in response to resource allocation directives 28 generated by the resource allocation engine 12. The resource allocation directives 28 may be of the interrupting or non-interrupting type. A non-interrupting directive takes effect after completion of a current task or immediately if no task is in progress. An interrupting directive takes effect immediately regardless of the resource status.

The resource allocation rules stored in the rules database 16 determine how ports are to be allocated to handle applications and are typically specified by a messaging system administrator based on the site requirements and traffic patterns. The resource allocation rules may include application usage restrictions based on time of day, application type, call traffic etc. As will be appreciated, message traffic in a messaging system is unpredictable. For example, a large number of incoming faxes and telephone calls may occur at the same time requiring more ports than are currently allocated to handle this type of traffic. As a result, it may be necessary to allocate more ports capable of handling incoming applications to deal with the unexpected traffic. By using the resource allocation rules, port allocation can be varied based on traffic patterns and on current messaging system traffic. Therefore, if the messaging system is experiencing heavy incoming traffic and there are few incoming application ports available, a predetermined number of shared ports can be reassigned to handle the incoming applications. Likewise, if incoming traffic is low, the shared ports can be re-assigned to allow use by other applications.

Table 1 below shows rule definitions for a thirty (30) port messaging system having eight (8) facsimile ports.

TABLE 1

| Group | Members | Resource Allocation Rules |
|---|---|---|
| 1 | Voice Ports: 1–6<br>Fax Ports: 1–2 | All Hours:<br>Dedicate to incoming applications |
| 2 | Voice Ports: 7–12<br>Fax Ports: 3–4 | Peak Hours:<br>Dedicate to incoming applications<br>Non-Peak Hours:<br>If incoming traffic is higher than n, dedicate to incoming applications. Otherwise use as needed |
| 3 | Voice Ports: 13–20<br>Fax Ports: 5 | All Hours:<br>If incoming traffic is higher than n, dedicate to incoming applications. Otherwise use as needed. |
| 4 | Voice Ports: 21, 22<br>Fax Ports: 6 | All Hours:<br>Dedicate to outgoing applications. |
| 5 | Fax Ports: 7, 8 | Business Hours:<br>Dedicate to incoming applications for VIP class users. |

TABLE 1-continued

| Group | Members | Resource Allocation Rules |
|---|---|---|
| | | Non-business Hours: As needed. |

In this embodiment, the ports of the messaging system are divided into five groups. Voice ports 1 to 6 and fax ports 1 and 2 form group 1. Voice ports 7 to 12 and fax ports 3 and 4 form group 2. Voice ports 13 to 20 and fax port 5 form group 3. Voice ports 21 and 22 and fax port 6 form group 4. Fax ports 7 and 8 form group 5. Assigned to each group of ports are resource allocation rules. As can be seen, for group 1, the resource allocation rules dedicate the ports to normal messaging for all hours. For group 2, the resource allocation rules dedicate the ports to normal messaging during peak hours only. As a result, at non-peak hours, the ports can be used as needed and therefore, other applications including outgoing applications can be allocated to the ports of group 2. However, during non-peak hours, if messaging traffic is higher than a predetermined threshold n, then the ports are dedicated to normal messaging. For group 3, regardless of the time of day, if messaging traffic is higher than the predetermined threshold n, the resource allocation rules dedicate the ports to normal messaging. Otherwise, the ports are used as needed. For group 4, the resource allocation rules dedicate the ports to outgoing applications only. For group 5, the resource allocation rules dedicate the ports to any application called by VIP class users during business hours. During non-business hours, the ports are used as needed.

As mentioned above, in order to determine the resource needs of the messaging system, the resource allocation engine 12 responds to trigger events generated by the trigger event agents 14 that effect the manner in which resources are allocated to applications to make better use of messaging system resources. Examples of trigger event agents 14 are shown in FIG. 1 and include a CPU utilization trigger event agent 18, a resource usage trigger event agent 20, a call traffic trigger event agent 22, and a system clock trigger event agent 24.

The CPU trigger event agent 18 generates CPU trigger events when CPU utilization is not available or not at an optimal rate. The resource usage trigger event agent 20 generates resource usage trigger events when resources are not available to handle applications and it is necessary to re-assign ports to handle the applications. The call traffic trigger event agent 22 generates call traffic events when the amount of incoming or outgoing traffic is higher or lower than a predetermined threshold level. In the case of incoming or outgoing traffic above the threshold level, the call traffic trigger events signify a need for additional port allocation to handle the traffic. In the case of incoming or outgoing traffic below the threshold level, the call traffic trigger events signify additional port availability. The system clock trigger event agent 24 generates system clock trigger events at specific times of the day to signal peak and non-peak hours as well as business and non-business hours.

During operation, the resource allocation engine 12 awaits receipt of trigger events from the trigger event agents 14. The resource allocation engine 12 in response to the trigger events accesses the rules database 16. Using the trigger events, the resource allocation engine 12 interprets the resource allocation rules and generates resource allocation directives 28. The resource allocation directives 28 are in turn conveyed to the appropriate allocation agents 26. The allocation agents 26 in response to the resource allocation directives 28 condition their associated ports to handle applications specified by the resource allocation rules and satisfy the messaging system requirements. Since the resource allocation engine 12 is responsive to non-traffic related trigger events, traffic level is not the only criteria used to allocate ports.

Figure 2:
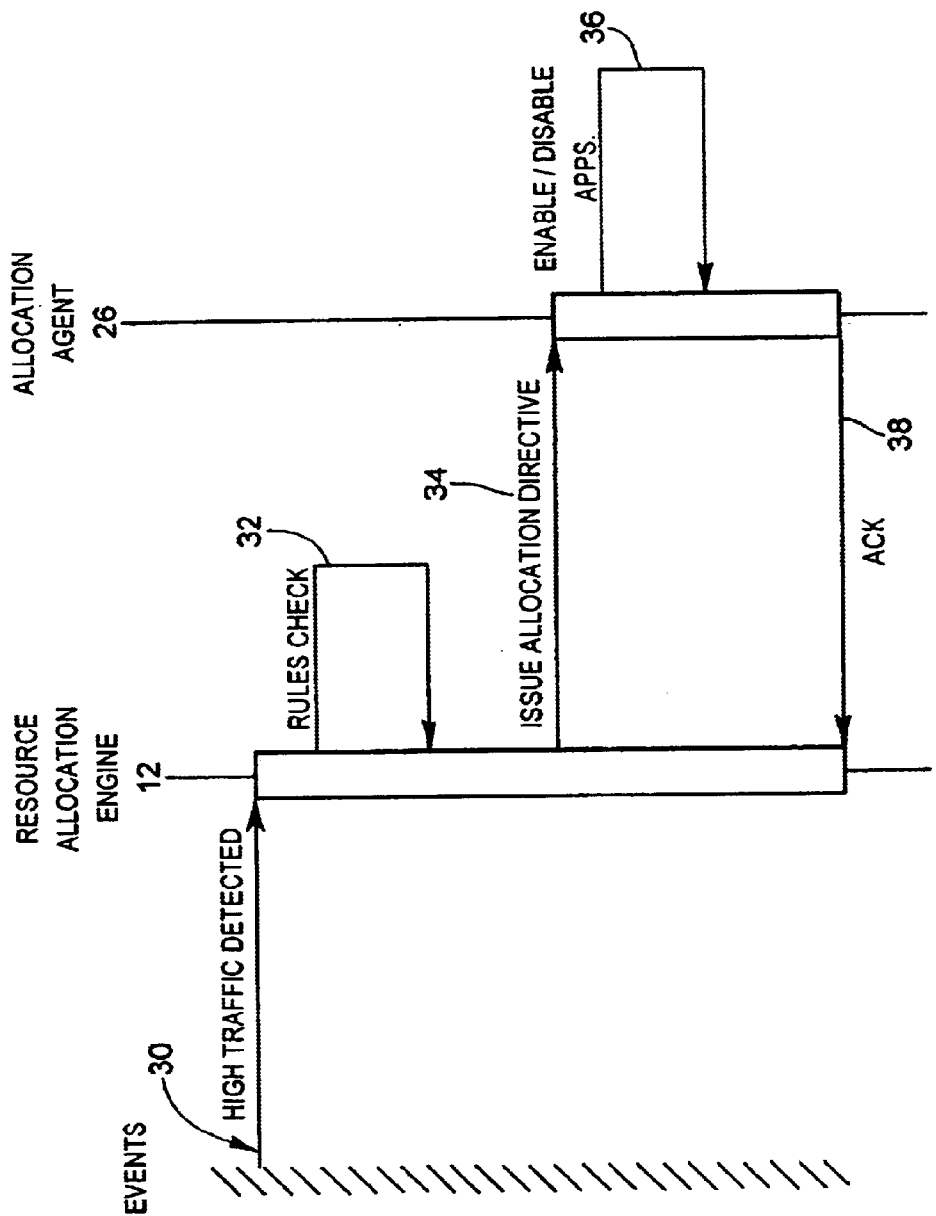
FIG. 2 is a representative use case showing traffic related resource reallocation.

Turning now to FIG. 2, an example of reassignment of resource allocation by the resource allocation manager 10 in response to a call traffic trigger event generated during peak hours is illustrated as a representative use case. In this case, high traffic above the threshold level is detected by the call traffic trigger event agent 22. The call traffic trigger event agent 22 in turn generates a call traffic trigger event 30 and conveys the call traffic event to the resource allocation engine 12. When the resource allocation engine 12 receives the call traffic trigger event, the resource allocation engine 12 accesses the resource allocation rules database 16 and checks 32 the resource allocation rules therein. Using the rules in Table 1, the resource allocation engine 12 generates a resource allocation directive 34 for the allocation agents 26 handling the ports of group 3. When the resource allocation agents 26 receive the resource allocation directive 34, they condition 36 their ports so that they become allocated to handle incoming applications. The resource allocation agents 26 also send an acknowledgment 38 to the resource allocation engine 12 confirming the re-assignment of the group 3 ports.

As will be appreciated, by providing rules governing the allocation of resources to applications based on specified events, resource allocation can be handled intelligently and dynamically to deal with messaging system needs. As a result, situations where resources are unavailable for certain applications while other resources remain idle are avoided. To illustrate the above, consider an eight port messaging system including the present resource allocation manager 10. In this example, the rules database 16 includes resource allocation rules, which specify the following port assignments:

two voice ports dedicated to handle incoming calls only;
during peak business hours, six voice ports and two fax ports dedicated to handle messaging applications;
under heavy messaging traffic conditions, all available voice ports and fax ports dedicated to handle messaging applications; and
under light incoming messaging traffic, additional voice ports and fax ports allocated to handle outgoing applications depending on the number of pending jobs.

Consider now the scenario where outside of business hours, a large number of outgoing faxes and page delivery jobs are pending, three ports are being used by outgoing applications and one port is being used by a normal messaging application. In this situation, based on the above resource allocation rules, the resource allocation manager 10 reallocates the two available voice ports and the available fax ports to handle the pending fax and page delivery jobs. Only two of the four voice ports are reallocated since the first resource allocation rule requires that two ports always be dedicated to handle incoming calls.

Now consider the scenario where there are no outgoing fax or page delivery jobs pending and six ports are being used for incoming applications. In this situation, based on the above resource allocation rules, when higher than normal incoming traffic is detected, the resource allocation manager 10 allocates all of the ports to handle incoming applications minimizing the chance that a caller receives a busy signal.

Finally, consider the scenario where a number of outgoing fax and page delivery jobs are pending and four ports are being used for fax delivery. Depending on the time of day, the resource allocation manager 10 will handle resource allocation differently. For example, during peak business hours, the resource allocation manager 10 would re-assign only two ports to handle the fax delivery jobs since the second rule specifies that six ports must be dedicated to handle incoming voice calls applications. However, outside of peak hours, the resource allocation manager 10 would re-assign additional ports to handle the fax delivery jobs.

As will be appreciated, the resource allocation manager 10 allocates resources to applications dynamically to accommodate changes in messaging system requirements. As a result, situations where ports are idle yet resources are unavailable to handle other applications occur to a lesser extent than in conventional messaging systems implementing a static resource allocation methodology. In high capacity messaging systems, the rules-based approach for allocating resources to applications provides for the reallocation of a significant number of resources in an intelligent manner.

If desired, a learning engine including artificial intelligence may also be included in the resource allocation manager to monitor traffic patterns and resource usage within the messaging system and modify automatically the resource allocation rules over time.

Although particular trigger event agents are shown in FIG. 1, those of skill in the art will appreciate that these trigger event agents are shown for illustrative purposes. The resource allocation manager 10 may be responsive to more or fewer trigger event agents. Also, although the trigger event agents are described as providing trigger events to the resource allocation engine 12, it should be appreciated that the resource allocation engine can poll the trigger event agents 14 for trigger events. Alternatively, a combination of polling and event based trigger event generation can be used.

Also, although the resource allocation manager 10 has been described as being used in a messaging system to allocate resources to handle applications, those of skill in the art will appreciate that the resource allocation manager may also be used to limit availability of certain types of resources to users, or classes of users. For example, in order to provide load stabilization, the resource allocation manager could disable/limit certain activities during high incoming traffic loads allowing resources to be allocated to handle more important tasks.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although a preferred embodiment of the present invention has been described, those of skill in the art will appreciate that variations and modifications may be made without departing from the spirit and scope thereof as defined by the appended claims.

I claim:

1. A method for allocating resources to handle applications in a messaging system comprising the steps of:
    establishing a set of resource allocation rules governing the allocation of resources to applications;
    monitoring the messaging system to detect events that potentially effect the manner in which resources of said messaging systems are allocated;
    accessing the resource allocation rules in response to detected events to determine if said detected events warrant a reallocation of resources to handle applications;
    generating resource allocation directives when said detected events warrant a reallocation of resources; and
    reallocating resources to handle applications in accordance with said resource allocation directives, wherein said resource allocation directives include non-interrupting and interrupting resource allocation directives, reallocation of said resources occurring immediately in response to interrupting resource allocation directives and occurring after completion of current tasks handled by the resources to be reallocated in response to said non-interrupting resource allocation directives.

2. The method of claim 1 wherein said detected events include a change in traffic level.

3. The method of claim 2 wherein said detected events include an increase in traffic level beyond a first threshold value.

4. The method of claim 3 wherein said detected events include a decrease in traffic level below a second threshold value.

5. The method of claim 3 wherein said detected events include particular times of day.

6. A method of claim 5 wherein said particular times of day identify traffic peak periods and non-peak periods or business and non-business hours.

7. A method of claim 1 further comprising monitoring traffic patterns and resource usage over time and adjusting the resource allocation rules in accordance therewith.

8. A method of claim 7 wherein said resource allocation rules are adjusted automatically.

9. A method of claim 1 wherein during said monitoring, event agents are polled to detect said events.

10. A resource allocation manager to allocate resources to handle applications in a messaging system, said resource allocation manager comprising:
    a database storing a set of resource allocation rules governing the allocation of resources to applications;
    a resource allocation engine responsive to events that potentially effect the manner in which resources are allocated, said resource allocation agent accessing said database and interpreting the resource allocation rules in response to events to determine if said events warrant a reallocation of resources to handle applications, said resource allocation engine generating resource allocation directives when said detected events warrant a reallocation of resources; and
    allocation agents responsive to said resource allocation engine and reallocating resources to handle applications wherein said resource allocation directives include non-interrupting and interrupting resource allocation directives, reallocation of said resources occurring immediately in response to interrupting resource allocation directives and occurring after completion of current tasks handled by the resources to be reallocated in response to said non-interrupting resource allocation directives.

11. A resource allocation manager as defined in claim 10 further comprising:
    a plurality of event detection agents monitoring said messaging system to detect said events.

12. A resource allocation manager as defined in claim 11 wherein said event detection agents notify said resource allocation engine of said events upon detection thereof.

13. A resource allocation manager as defined in claim 11 wherein said event detection agents include a traffic agent to monitor traffic level.

14. A resource allocation manager as defined in claim 13 wherein said traffic agent detects at least one of an increase in traffic level beyond a predetermined threshold value and a decrease in traffic level below a predetermined threshold value.

15. A resource allocation manager as defined in claim 13 wherein said event detection agents include a system clock agent to detect particular times of the day.

16. A resource allocation manager as defined in claim 15 wherein said system clock agent detects traffic peak periods and non-peak periods or business and non-business hours.

17. A resource allocation manager as defined in claim 10 further comprising:

a learning engine monitoring traffic patterns and resource usage over time and adjusting the resource allocation rules in accordance therewith.

18. A resource allocation manager as defined in claim 17 wherein said learning engine adjusts said resource allocation rules automatically.

19. A resource allocation manager as defined in claim 10 wherein said resource allocation engine generates allocation directives when a reallocation of resources is required, and wherein said allocation agents are responsive to said allocation directives and operate to reallocate the resources in accordance with said allocation directives.

20. A method for allocating ports of a messaging system to incoming and outgoing communication facilities comprising the steps of:

establishing a set of resource allocation rules governing the allocation of said ports to communicate facilities of said messaging system, at least one of said ports being dedicated to a specific communication facility during a predetermined period of the day;

monitoring the messaging system to detect events that effect the manner by which ports are allocated to said communication facilities;

accessing the resource allocation rules to determine how said ports are to be reallocated in response to said detected events and generating resource allocation directives, said resource allocation directives including interrupting and non-interrupting resource allocation directives; and reallocating ports to accommodate needs of said communication facilities in accordance with said resource allocation directives.

21. The method of claim 20 wherein a plurality of ports are dedicated a specific communication facility during a predetermined period of the day.

22. The method of claim 21 wherein at least some of said ports are dedicated to a specific communication facility at all times and are not reallocated in response to resource allocation directives.

23. The method of claim 22 wherein said ports include both voice and facsimile ports.

24. The method of claim 23 wherein said detected events include a change in communication traffic level.

25. The method of claim 24 wherein said detected events include an increase in traffic level beyond a first threshold value and a decrease in traffic level below a second threshold value.

26. The method of claim 22 further comprising the step of monitoring communication traffic patterns and port usage over time and adjusting the resource allocation rules in accordance therewith.

27. The method of claim 23 wherein selected ones of said voice and facsimile ports are dedicated to specific communication facilities at all times and wherein selected others of said voice and facsimile ports are dedicated to specific communication facilities at specified periods of the day.

* * * * *